United States Patent [19]
Ohno

[11] Patent Number: 5,739,965
[45] Date of Patent: Apr. 14, 1998

[54] WIDE ANGLE LENS SYSTEM FOR CAMERA

[75] Inventor: Kazunori Ohno, Saitama, Japan

[73] Assignee: Fuji Photo Optical Co., Ltd., Saitama, Japan

[21] Appl. No.: 655,901

[22] Filed: May 31, 1996

[30] Foreign Application Priority Data

May 31, 1995 [JP] Japan .................. 7-158401

[51] Int. Cl.⁶ .................. G02B 13/04; G02B 13/18; G02B 9/04
[52] U.S. Cl. .................. 359/753; 359/717; 359/793; 359/794
[58] Field of Search .................. 359/793, 753, 359/717, 794

[56] References Cited

U.S. PATENT DOCUMENTS

| | | | |
|---|---|---|---|
| 5,508,848 | 4/1996 | Inoue | 359/717 |
| 5,552,936 | 9/1996 | Ohno | 359/717 |
| 5,604,639 | 2/1997 | Bietry et al. | 359/717 |

Primary Examiner—Scott J. Sugarman
Attorney, Agent, or Firm—Young & Thompson

[57] ABSTRACT

A wide angle lens comprises in order from the object end an aperture stop, a first meniscus lens $L_1$ having a convex object end surface and a second positive power lens element $L_2$, the lens satisfying the following conditions:

$$-0.10 < f_2/f_1 < 0.7$$

$$4.0 < f/R_1 < 7.5$$

$$0 < f/R_3 < 1.6$$

$$0.01 < D/f < 0.22$$

where $f_1$, $f_2$ and $f$ are the focal length of the first lens $L_1$, the second lens $L_2$ and the overall lens system, respectively, $R_1$ and $R_3$ are the radii of the object end surfaces of the first and second lenses $L_1$ and $L_2$, respectively, and D is the axial distance between the object end surface of the first lens $L_1$ and the image plane.

15 Claims, 6 Drawing Sheets

OBJECT END ←        IMAGE END →

OBJECT END ←        IMAGE END →

OBJECT END ← → IMAGE END

OBJECT END ← → IMAGE END

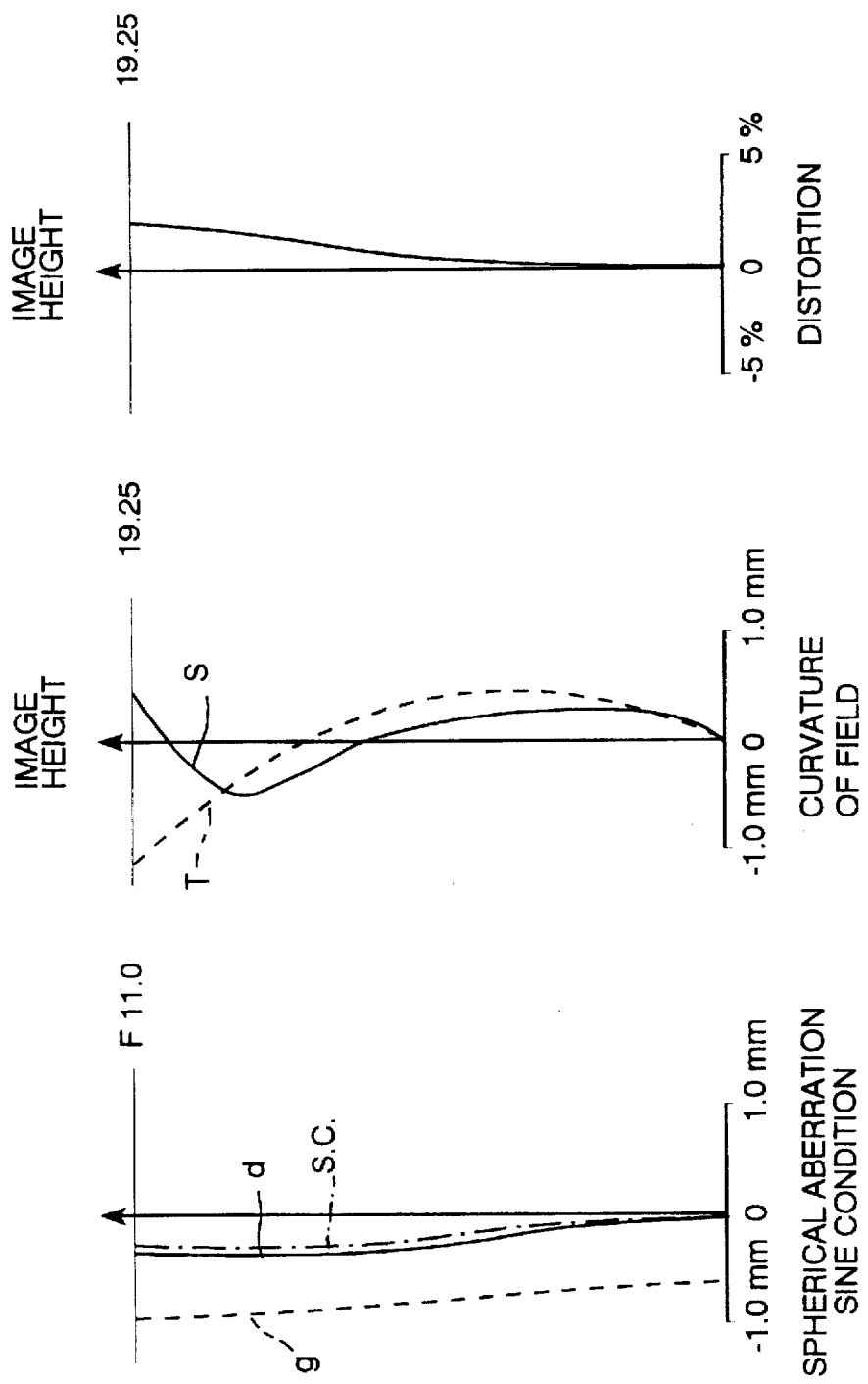

WIDE ANGLE LENS SYSTEM FOR CAMERA

BACKGROUND OF THE INVENTION

1. Field of the Invention

The present invention relates to a wide angle lens system suitable for a still camera and an electronic still camera, and, more particularly, to a two lens element wide angle lens system for a still camera which is simple in construction and low in price.

2. Description of Related Art

Typically, a wide angle lens for use with a photographic camera, such as a ordinary still camera and an electronic still camera, has an aperture stop placed between two convex lens elements which is called a between the lens stop. A large number of the between the lens aperture type of wide angle lenses have a symmetrical lens arrangement which has the advantage of providing prominent imaging performance and a wide angle of view.

Such a wide angle lens of the between the lens aperture type is often necessitated to have a long overall axial length from the front lens surface to an image plane and is in need of troublesome fabrication work. For use, in particular, with a simplified camera which has a demand for thinness and compactness, the wide angle lens of the between the lens aperture type must have an overall axial length as short as possible.

SUMMARY OF THE INVENTION

It is an object of the present invention to provide a compact wide angle lens for a still camera having a shortened overall axial length from the front lens surface to an image plane and prominent imaging performance while having a simple construction of the optical system.

It is another object of the present invention to provide a compact wide angle lens for a camera which achieves uncomplicated fabrication work and can be marketed at a low price.

These objects of the present invention are accomplished by providing a before the lens aperture stop type of wide angle lens comprising two lens groups, namely a first lens group $L_1$ and a second lens group $L_2$ in order from the object end, with a before-the-lenses aperture stop. Each lens group comprises a single element. The first lens element $L_1$, which may have a positive power or a negative power, comprises a meniscus lens having a convex object end surface and the second lens element $L_2$ having a positive power. The wide angle lens must satisfy the following conditions (I)–(IV):

$$-0.10 < f_2/f_1 < 0.7 \quad \text{(I)}$$

$$4.0 < f/R_1 < 7.5 \quad \text{(II)}$$

$$0 < f/R_3 < 1.6 \quad \text{(III)}$$

$$0.01 < D/F < 0.22 \quad \text{(IV)}$$

where $f_1$ designates the focal length of the first lens element $L_1$;

$f_2$ designates the focal length of the second lens element $L_2$;

$f$ designates the overall focal length of the wide angle lens;

$R_1$ designates the radius of curvature of the object end surface of the first lens element $L_1$;

$R_3$ designates the radius of curvature of the object end surface of the second lens element $L_2$;

D designates the axial distance between the object end surface of the first lens element $L_1$ and the image plane.

The before-the-lenses aperture stop may be placed at an axial position where the vertex of the object end convex surface of the first lens element $L_1$ or at an axial position distant on the object side from the vertex of the object end convex surface of the first lens element $L_1$.

The parameters set forth are necessary for suitably balancing the aberrations of the lens system. Satisfaction of these conditions ensures a compact lens system with a shortened overall axial length.

The first parameter (I) yields the distribution of optical power necessary for a shortened overall axial length of the lens system and improved imaging performance. If the lower limit is exceeded, or stated alternatively, the optical power of the second lens element $L_2$ becomes too strong, it is difficult or impossible to satisfactorily correct spherical aberration, the curvature of field and distortion. Although, even the first parameter (I) is not satisfied, the spherical aberration and the curvature of field may be corrected to a certain extent by employing aspherical lens elements or forming a curved image plane, it is difficult to prevent aggravation of the distortion and to shorten the overall axial length. On the other hand, if the upper limit is exceeded, while the overall axial length of the lens system is shortened, nevertheless, it is difficult to prevent or significantly reduce aggravation of lateral chromatic aberrations and astigmatism even by forming a curved image plane.

The second and third parameters (II) and (III) provides, on the condition that the first condition is satisfied, improvement of the imaging performance and a reduction in the overall axial length of the lens system. If the lower limit of the parameter (II) is exceeded, while it is possible to satisfactorily correct the spherical aberration, nevertheless, it is difficult to prevent or significantly reduce aggravation of the curvature of field and to shorten the overall axial length of the lens system. On the other hand, if the upper limit is exceeded of the parameter (II), while ensuring a shortened overall axial length of the lens system and satisfactorily correcting the curvature of field, nevertheless, it is difficult to prevent or significantly reduce aggravation of the spherical aberration and coma. Further, if the lower limit of the parameter (III) is exceeded, or stated alternatively, the radius of curvature of the image end surface of the second lens element $L_2$ becomes too large, the overall axial length of the lens system becomes long and it is difficult to significantly reduce aggravation of the spherical aberration. On the other hand, if the upper limit is exceeded, the lens system produces enhanced lateral chromatic aberrations.

The fourth parameter (IV) provides the relationship between the overall axial length of the lens system and the overall focal length of the lens system for compactness of the lens system. If the upper limit is exceeded, the outer diameter of the second lens element becomes too large which is always undesirable for compactness. If the lower limit is exceeded, it is hard to provide each of the first and second lens elements with a sufficient axial thickness and to ensure a compact lens system with a desired axial distance between the first and second lens elements, which results in unsatisfactorily correction of the curvature of field.

The wide angle lens system preferably has aspherical surfaces, one or more on either one or each of the two lens elements $L_1$ and $L_2$ as will be made apparent from the examples in the following tables. The aspherical surfaces may be defined by the following equation:

$$X = \frac{Cy^2}{1 + \sqrt{1 - KC^2Y^2}} + a_1Y^4 + a_2Y^6 + a_3Y^8 + a_4Y^{10}$$

where

X is the surface sag at a semi-aperture distance Y from the axis A of the lens system;

C is the curvature of a lens surface at optical axis A equal to the reciprocal of the radius at the optical axis;

K is a conic constant;

$a_1$—$a_1$ are aspheric coefficients.

The two-lens, before-the-lenses aperture stop type wide angle lens system including at least one aspherical surface ensures prominent imaging performance and an improved wide angle of view. Different from the conventional between-the-lenses aperture stop type wide angle lens system, a wide angle lens system having an unsymmetrical lens arrangement, like the wide angle lens system of this invention, which has a before-the-lenses aperture stop and two single lens elements greatly different in shape from each other tends to produce distortion becoming greater as an increase in the angle of view. This tendency of the two-lens, before the lenses aperture stop type wide angle lens system, which is due to the unsymmetrical arrangement, is eliminated by forming aspherical surfaces, one or more on either one or each of the two lens elements $L_1$ and $L_2$.

Together, each lens element $L_1$, $L_2$ may desirably be made of plastic materials at low costs.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIGS. 8(A) to 8(C) are graphs showing characteristic curves of spherical aberrations and sine condition, the curvature of field and distortion, respectively, of the wide angle lens system of FIG. 4.

DETAILED DESCRIPTION OF THE SPECIFIC EMBODIMENTS

A wide angle lens system in each embodiment of the invention as exemplified in FIG. 1–4 is comprised, in order from the object end to the image end, an aperture stop I, a first meniscus lens element $L_1$ having a convex object end surface and a second lens element $L_2$ having a positive power. The wide angle lens is designed to satisfy the following conditions (I)–(IV):

| | |
|---|---|
| $-0.10 < f_2/f_1 < 0.7$ | (I) |
| $4.0 < f/R_1 < 7.5$ | (II) |
| $0 < f/R_3 < 1.6$ | (III) |
| $0.01 < D/f < 0.22$ | (IV) | where $f_1$ designates the focal length of the first lens element $L_1$;

$f_2$ designates the focal length of the second lens element $L_2$;

f designates the overall focal length of the wide angle lens;

$R_1$ designates the radius of curvature of the object end surface of the first lens element $L_1$;

$R_3$ designates the radius of curvature of the object end surface of the second lens element $L_2$;

D designates the axial distance between the object end surface of the first lens element $L_1$ and the image plane.

In the following tables, various embodiments of the invention are set forth, with parameters of the invention. In the following prescription tables, the reference L followed by an arabic numeral indicates the lens element progressively from the object end to the image end of the lens system, the reference radius numbers R are the progressive lens surface radii, the reference d followed by an arabic numeral indicates the axial distance between lens surfaces progressively from the object end to the image end of the lens system. Positive surface radii are struck from the right of the lens surface on the optical axis, and negative surface radii are struck from the left of the lens surface on the optical axis. Nd is the index of refraction of the lens element as measured with d-line. ν is the Abbe number of the lens element. L is the front vertex distance measured from the front surface of the first lens element on the object side to the image plane. Bf indicates the back focal length measured as a distance $d_4$ between the vertex of the image end surface of the second lens element and an image plane F where a film is placed. L/f indicates the telephoto ratio when focused to infinity. 2ω indicates the angle of view.

EXAMPLE I

Figure 1:
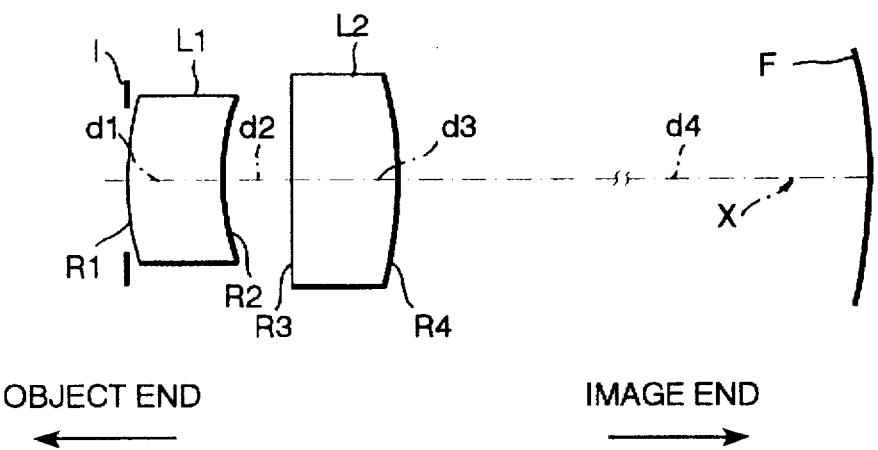
FIG. 1 is a diagrammatic side view of an wide angle lens system for a still camera in accordance with a specific embodiment of the invention.

Referring to FIG. 1 showing a wide angle lens system for a still camera in accordance with an embodiment of the invention, the wide angle lens system is comprised of, in order from the object end to the image end, an aperture stop I, a meniscus lens element $L_1$ having a convex object end surface and a lens element $L_2$ having a positive power. Each of the first and second lens elements $L_1$ and $L_2$ comprises a single lens made of plastic. The meniscus lens element $L_1$, which is of negative power, has an aspherical convex object end surface and a spherical concave image end surface. The positive power lens element $L_2$ comprises a biconvex lens having an aspherical convex object end surface and a spherical convex image end surface stronger in curvature than the object end surface. The aperture stop I is located at an axial point on the object side where the vertex of the object end convex surface of the first lens element $L_1$ is positioned. An image plane F where a photographic film is placed is curved with a curvature of radius of -100.0 mm.

A wide angle lens system shown in FIG. 1 scaled to a first lens element focal length $f_1$ of −312.24 mm, a second lens element focal length $f_2$ of 26.85 mm, an overall focal length f of 32.47 mm, a back focal length Bf of 29.571 mm and an angle of view 2ω of 67.4° is substantially described in Table I.

TABLE I

| Element | Radius of Curvature(mm) | Axial Distance Between surfaces(mm) | Nd | ν |
|---|---|---|---|---|
| $L_1$ | $R_1 = 5.309$ | | | |
| | | $d_1 = 1.50$ | 1.49116 | 57.8 |
| | $R_2 = 4.654$ | | | |
| | | $d_2 = 0.90$ | | |
| $L_1$ | $R_3 = 198.555$ | | | |
| | | $d_3 = 1.50$ | 1.49116 | 57.8 |
| | $R_4 = -14.089$ | | | |

Aspherical Surface: $R_1$ and $R_3$
Conic Constant and Aspherical Coefficient

| | $R_1$ | $R_3$ |
|---|---|---|
| K | 7.44698 | 3674.719 |
| $a_1$ | $-0.637315 \times 10^{-2}$ | $0.781309 \times 10^{-3}$ |
| $a_2$ | $0.968608 \times 10^{-4}$ | $0.141142 \times 10^{-3}$ |
| $a_3$ | $-0.571697 \times 10^{-3}$ | $-0.548809 \times 10^{-5}$ |
| $a_4$ | 0.0 | 0.0 |
| Curvature C | 0.188359 | 0.005036 |

The wide angle lens system depicted in FIG. 1 and described in Table I has the parameters as follows:

| $f_2/f_1$ | $f/R_1$ | $f/R_3$ | D/f | L(mm) | L/f |
|---|---|---|---|---|---|
| −0.0860 | 6.1160 | 0.1635 | 0.1200 | 33.471 | 1.031 |

As apparent from the above, the wide angle lens system depicted in FIG. 1 and described in Table I satisfies all of the conditions (I)–(IV).

Figure 5C:
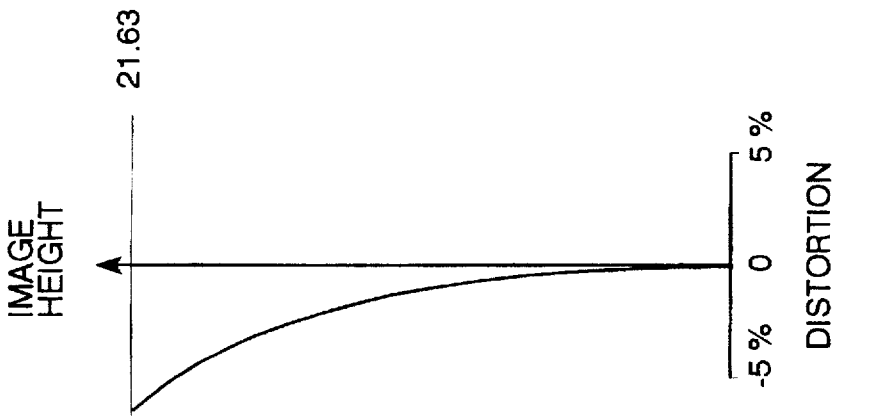
FIGS. 5(A) to 5(C) are graphs showing characteristic curves of spherical aberrations and sine condition, the curvature of field and distortion, respectively, of the wide angle lens system of FIG. 1.
Figure 5B:
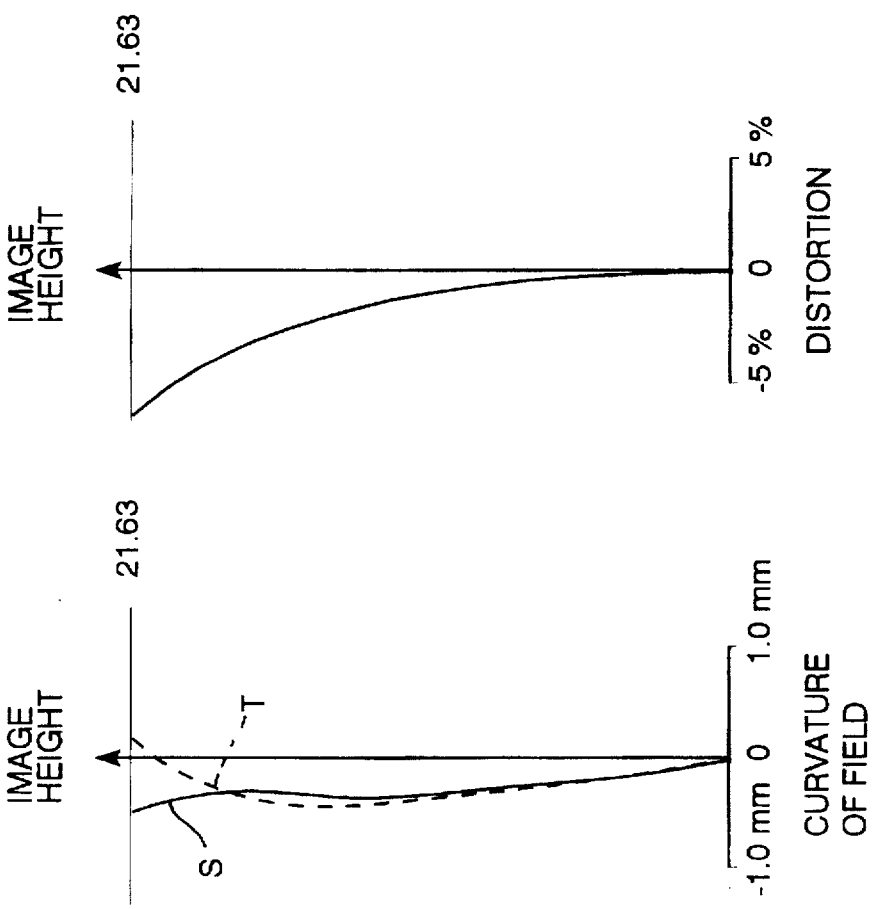
Figure 5A:
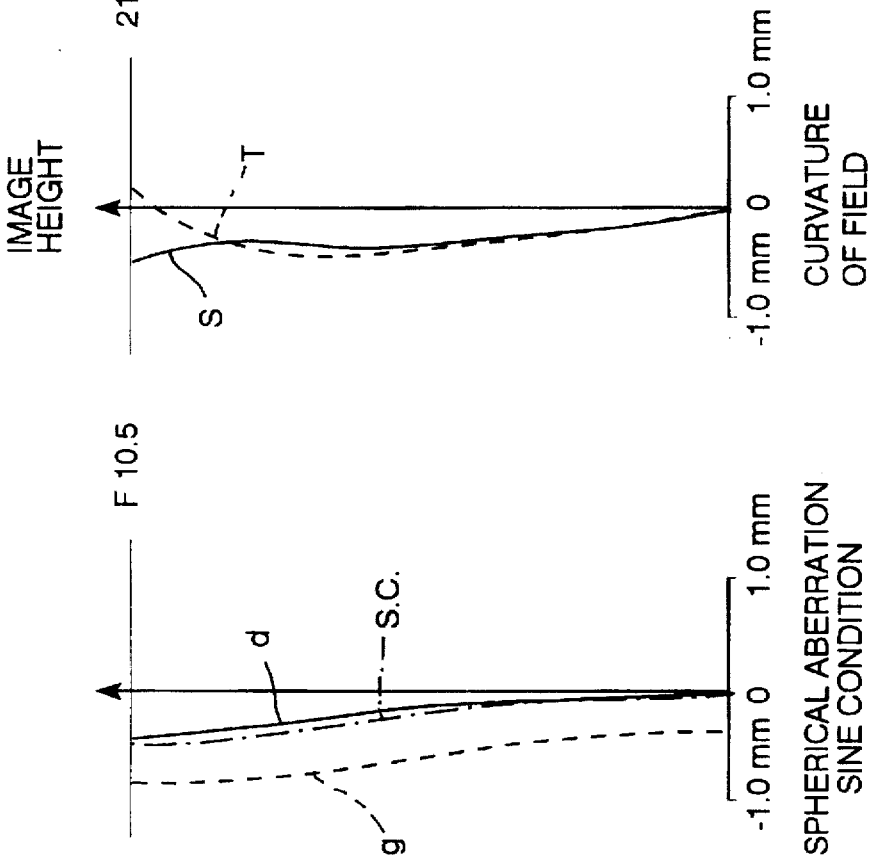

FIGS. 5(A)–5(C) show various aberrations, including spherical aberrations, the curvature of field and distortion of the wide angle lens system shown in FIG. 1, and demonstrates that the wide angle lens system has well corrected and suitably balanced aberrations.

EXAMPLE II

Figure 2:
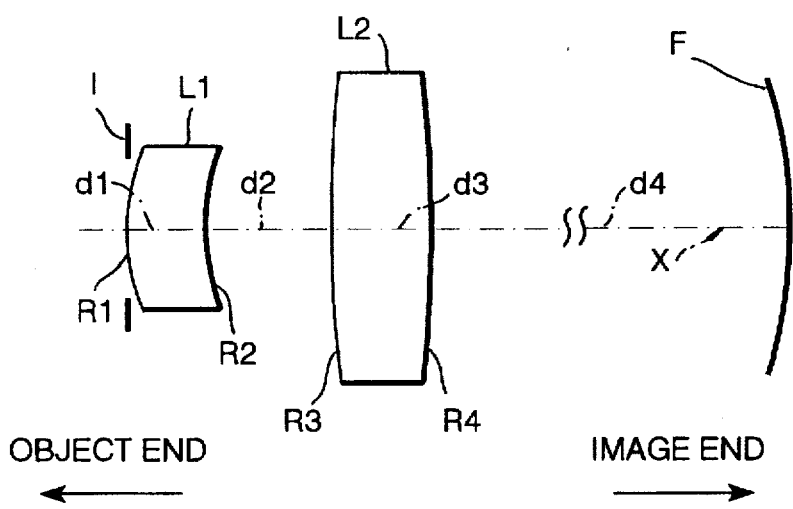
FIG. 2 is a diagrammatic side view of an wide angle lens system for a still camera in accordance with another specific embodiment of the invention.

Referring to FIG. 2 showing a wide angle lens system for a still camera in accordance with another embodiment of the invention, the wide angle lens system is comprised of, in order from the object end to the image end, an aperture stop I, a meniscus lens element $L_1$ having a spherical convex object end surface and a lens element $L_2$ having a positive power. Each of the first and second lens elements $L_1$ and $L_2$ comprises a single lens. The meniscus lens element $L_1$, which is of positive power, has a spherical concave image end surface. The positive power lens element $L_2$ comprises a biconvex lens having a spherical convex object end surface and an aspherical convex image end surface stronger in curvature than the object end surface. The aperture stop I is located at an axial point on the object side where the vertex of the object end convex surface of the first lens element $L_1$ is positioned. An image plane F where a photographic film is placed is curved with a curvature of radius of −100.0 mm.

A wide angle lens system shown in FIG. 2 scaled to a first lens element focal length $f_1$ of 68.52 mm, a second lens element focal length $f_2$ of 34.61 mm, an overall focal length f of 25.30 mm, a back focal length Bf of 21.351 mm and an angle of view 2ω of 74.5° is substantially described in Table II.

TABLE II

| Element | Radius of Curvature(mm) | Axial Distance Between surfaces(mm) | Nd | ν |
|---|---|---|---|---|
| $L_1$ | $R_1 = 4.439$ | | | |
| | | $d_1 = 1.40$ | 1.49244 | 57.6 |
| | $R_2 = 4.580$ | | | |
| | | $d_2 = 1.66$ | | |
| $L_1$ | $R_3 = 37.913$ | | | |
| | | $d_3 = 1.60$ | 1.49244 | 57.6 |
| | $R_4 = -30.538$ | | | |

Aspherical Surface: $R_4$
Conic Constant and Aspherical Coefficient

| | $R_4$ |
|---|---|
| K | 1.00 |
| $a_1$ | $0.2645396 \times 10^{-3}$ |
| $a_2$ | $-0.193124 \times 10^{-4}$ |
| $a_3$ | $0.129464 \times 10^{-6}$ |
| $a_4$ | $0.807664 \times 10^{-9}$ |
| Curvature C | −0.032746 |

The wide angle lens system depicted in FIG. 2 and described in Table II has the parameters as follows:

| $f_2/f_1$ | $f/R_1$ | $f/R_3$ | D/f | L(mm) | L/f |
|---|---|---|---|---|---|
| 0.5051 | 5.6995 | 0.6673 | 0.1842 | 26.011 | 1.023 |

As apparent from the above, the wide angle lens system depicted in FIG. 2 and described in Table II satisfies all of the conditions (I)–(IV).

Figure 6C:
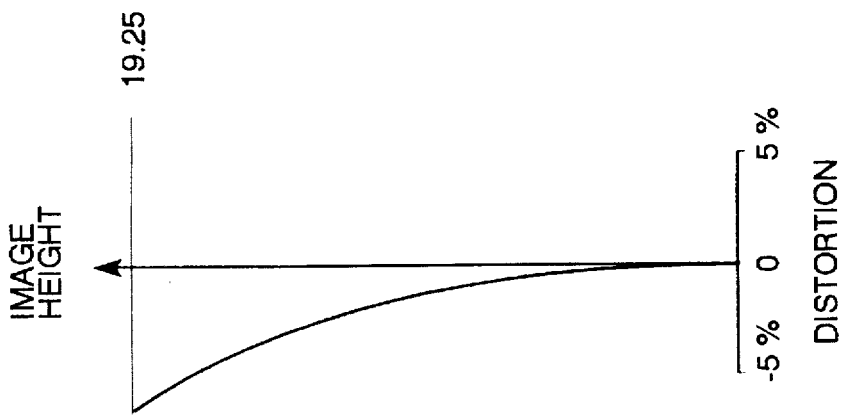
FIGS. 6(A) to 6(C) are graphs showing characteristic curves of spherical aberrations and sine condition, the curvature of field and distortion, respectively, of the wide angle lens system of FIG. 2.
Figure 6B:
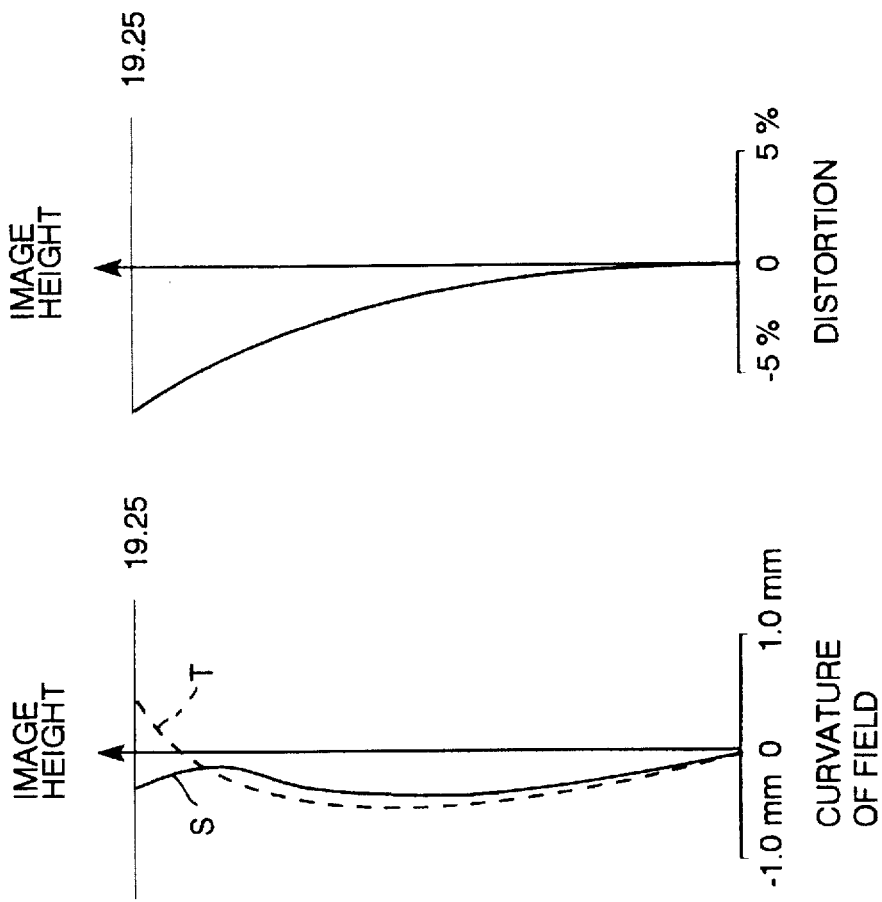
Figure 6A:
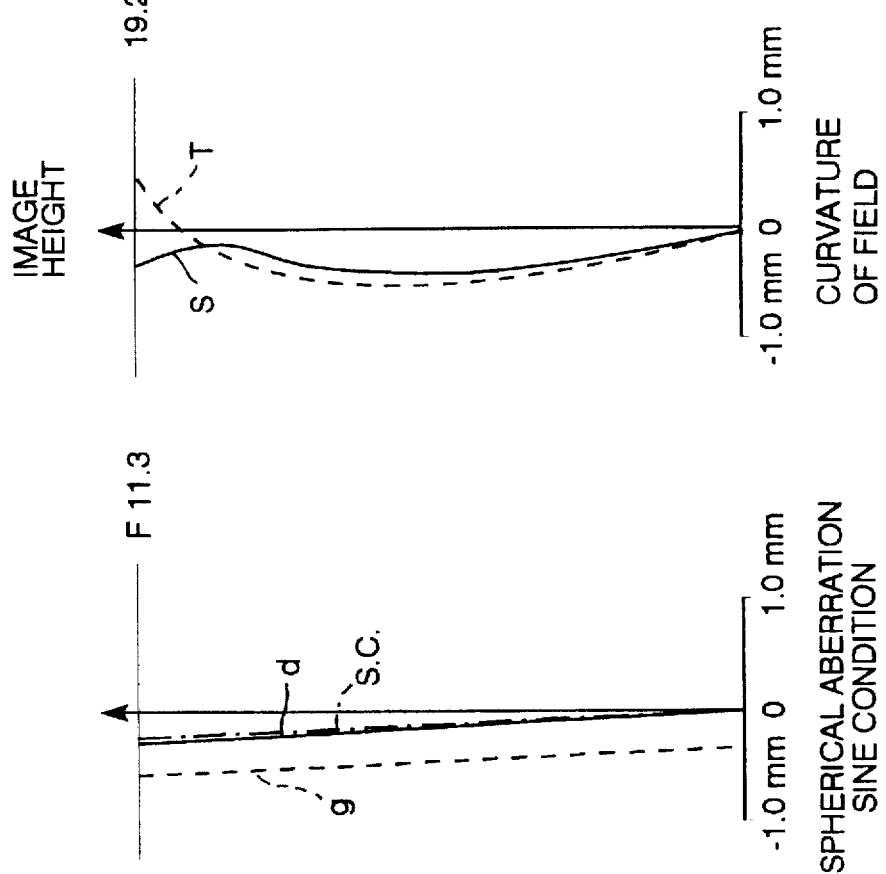

FIGS. 6(A)–6(C) show various aberrations, including spherical aberrations, the curvature of field and distortion of the wide angle lens system shown in FIG. 2, and demonstrates that the wide angle lens system has well corrected and suitably balanced aberrations.

EXAMPLE III

Figure 3:
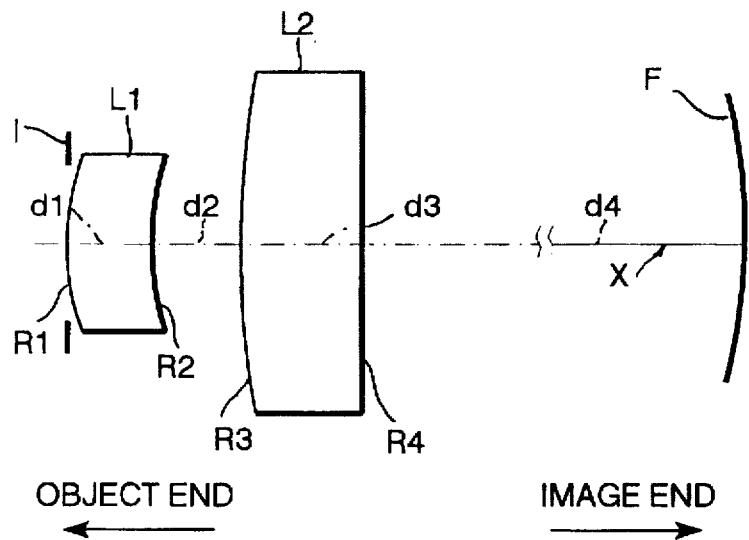
FIG. 3 is a diagrammatic side view of an wide angle lens system for a still camera in accordance with still another specific embodiment of the invention.

FIG. 3 shows a wide angle lens system for a still camera in accordance with still another embodiment of the invention. The wide angle lens system is comprised of, in order from the object end to the image end, an aperture stop I, a meniscus lens element $L_1$ having a spherical convex object end surface and a lens element $L_2$ having a positive power. Each of the first and second lens elements $L_1$ and $L_2$ comprises a single lens. The meniscus lens element $L_1$, which is of positive power, has a spherical concave image end surface. The positive power lens element $L_2$ comprises a meniscus lens having a spherical convex object end surface and an aspherical concave image end surface. The aperture stop I is located at an axial distance of 3.0 mm on the object side from the vertex of the object end surface of the meniscus lens element $L_1$ is positioned. An image plane F where a photographic film is placed is curved with a curvature of radius of −85.0 mm.

A wide angle lens system shown in FIG. 3 scaled to a first lens element focal length $f_1$ of 62.89 mm, a second lens element focal length $f_2$ of 36.44 mm, an overall focal length f of 25.00 mm, a back focal length Bf of 20.655 mm and an angle of view 2ω of 75.2° is substantially described in Table III.

TABLE III

| Element | Radius of Curvature(mm) | Axial Distance Between surfaces(mm) | Nd | ν |
|---|---|---|---|---|
| $L_1$ | $R_1 = 4.289$ | $d_1 = 1.30$ | 1.49244 | 57.6 |
|  | $R_2 = 4.481$ | $d_2 = 1.39$ |  |  |
| $L_1$ | $R_3 = 17.550$ | $d_3 = 1.90$ | 1.49244 | 57.6 |
|  | $R_4 = 767.040$ |  |  |  |

Aspherical Surface: $R_4$
Conic Constant and Aspherical Coefficient:

|  | $R_4$ |
|---|---|
| K | −71158.06 |
| $a_1$ | $0.762047 \times 10^{-3}$ |
| $a_2$ | $-0.610663 \times 10^{-4}$ |
| $a_3$ | $0.316390 \times 10^{-5}$ |
| $a_4$ | $-0.798321 \times 10^{-7}$ |
| Curvature: C | 0.0013037 |

The wide angle lens system depicted in FIG. 3 and described in Table III has the parameters as follows:

| $f_2/f_1$ | $f/R_1$ | $f/R_3$ | D/f | L(mm) | L/f |
|---|---|---|---|---|---|
| 0.5794 | 5.8289 | 1.4245 | 0.1836 | 25.245 | 1.010 |

As apparent from the above, the wide angle lens system depicted in FIG. 3 and described in Table III satisfies all of the conditions (I)–(IV).

Figure 7A:
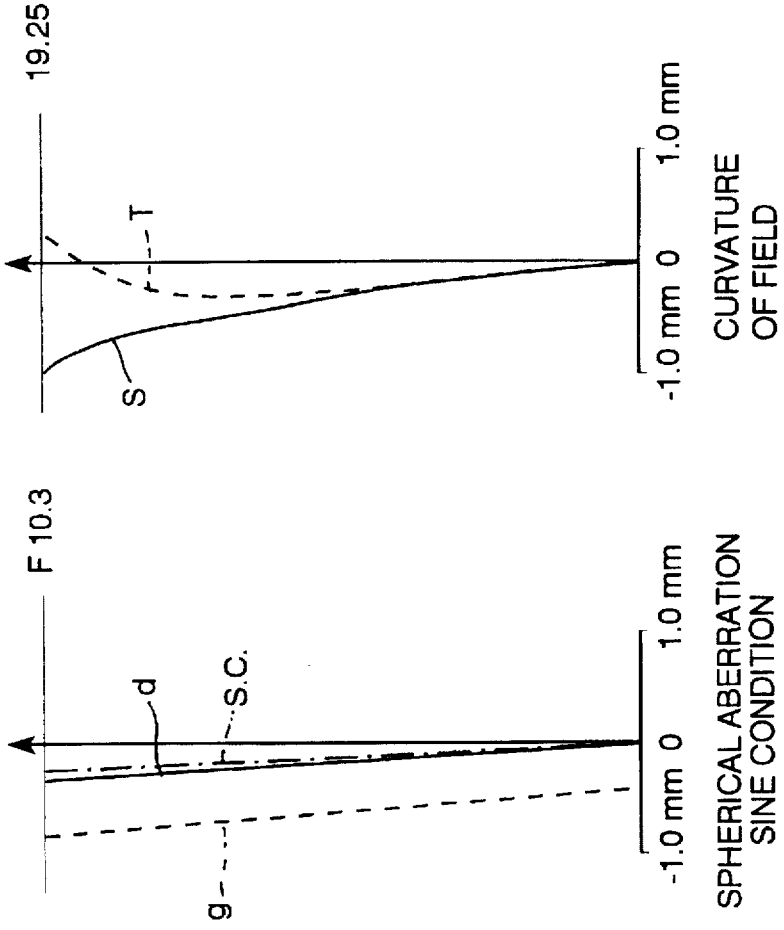
FIGS. 7(A) to 7(C) are graphs showing characteristic curves of spherical aberrations and sine condition, the curvature of field and distortion, respectively, of the wide angle lens system of FIG. 3.
Figure 7B:
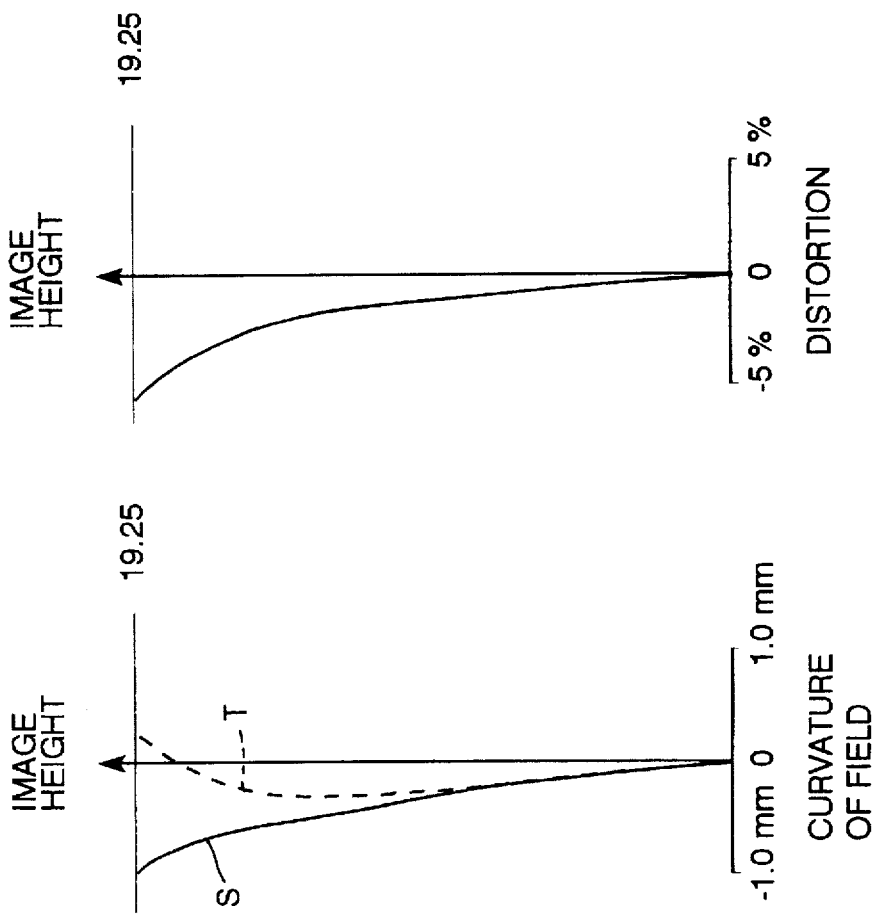
Figure 7C:
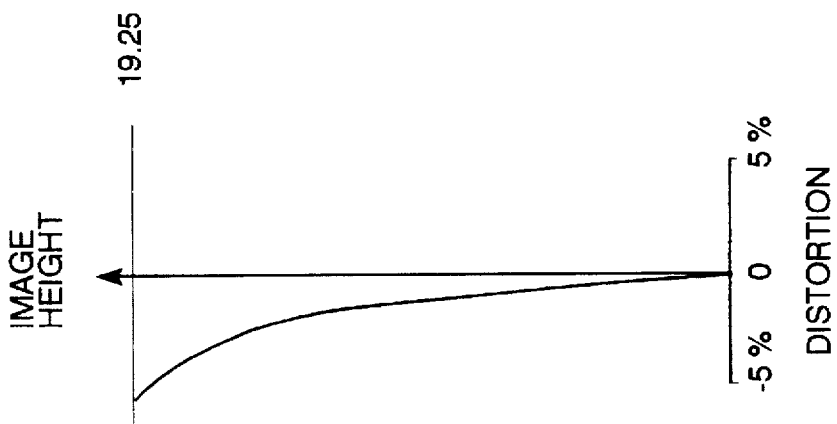

FIGS. 7(A)–7(C) show various aberrations, including spherical aberrations, the curvature of field and distortion of the wide angle lens system shown in FIG. 3, and demonstrates that the wide angle lens system has well corrected and suitably balanced aberrations.

EXAMPLE IV

Figure 4:
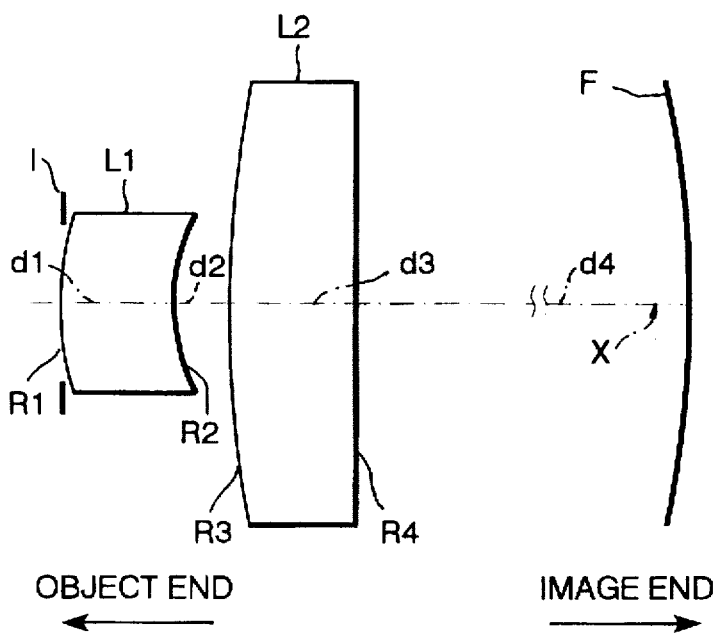
FIG. 4 is a diagrammatic side view of an wide angle lens system for a still camera in accordance with a further specific embodiment of the invention.

FIG. 4 showing a wide angle lens system for a still camera in accordance with a further embodiment of the invention. The wide angle lens system is comprised of, in order from the object end to the image end, an aperture stop I, a meniscus lens element $L_1$ having a convex object end surface and a lens element $L_2$ having a positive power. Each of the first and second lens elements $L_1$ and $L_2$ comprises a single lens made of plastic. The meniscus lens element $L_1$, which has positive power, has a spherical convex object end surface and an aspherical concave image end surface. The positive power lens element $L_2$ comprises a biconvex lens having a spherical convex object end surface and an aspherical convex image end surface. The spherical convex object end surface is stronger in curvature than the aspherical convex image end surface. The aperture stop I is located at an axial point on the object side where the vertex of the object end convex surface of the first lens element $L_1$ is positioned. An image plane F where a photographic film is placed is curved with a curvature of radius of −90.0 mm.

A wide angle lens system shown in FIG. 4 scaled to a first lens element focal length $f_1$ of 95.19 mm, a second lens element focal length $f_2$ of 27.92 mm, an overall focal length f of 24.00 mm, a back focal length Bf of 19.737 mm and an angle of view 2ω of 77.5° is substantially described in Table IV.

TABLE IV

| Element | Radius of Curvature(mm) | Axial Distance Between surfaces(mm) | Nd | ν |
|---|---|---|---|---|
| $L_1$ | $R_1 = 5.067$ | $d_1 = 1.82$ | 1.49244 | 57.6 |
|  | $R_2 = 5.006$ | $d_2 = 0.88$ |  |  |
| $L_1$ | $R_3 = 15.926$ | $d_3 = 1.98$ | 1.49244 | 57.6 |
|  | $R_4 = -96.500$ |  |  |  |

Aspherical Surface: $R_2$ and $R_4$
Conic Constant and Aspherical Coefficient:

|  | $R_2$ | $R_4$ |
|---|---|---|
| K | −1.191124 | −15853.73 |
| $a_1$ | $-0.458142 \times 10^{-3}$ | $0.413083 \times 10^{-3}$ |
| $a_2$ | $0.124943 \times 10^{-2}$ | $-0.143931 \times 10^{-4}$ |
| $a_3$ | $-0.201013 \times 10^{-3}$ | $-0.298829 \times 10^{-6}$ |
| $a_4$ | $0.626870 \times 10^{-16}$ | $-0.792994 \times 10^{-14}$ |
| Curvature: C | 0.199760 | −0.010363 |

The wide angle lens system depicted in FIG. 4 and described in Table IV has the parameters as follows:

| $f_2/f_1$ | $f/R_1$ | $f/R_3$ | D/f | L(mm) | L/f |
|---|---|---|---|---|---|
| 0.2933 | 4.7367 | 1.5070 | 0.1950 | 24.417 | 1.017 |

As apparent from the above, the wide angle lens system depicted in FIG. 4 and described in Table IV satisfies all of the conditions (I)–(IV).

FIGS. 8(A)–8(C) show various aberrations, including spherical aberrations, the curvature of field and distortion of the wide angle lens system shown in FIG. 4, and demonstrates that the wide angle lens system has well corrected and suitably balanced aberrations.

The fact that the telephoto ratio (L/f) is between 1.0 and 1.03 ensures compactness and high performance of the wide angle lens system with suitably balanced aberrations. Together, the wide angle lens system has the angle of view between 67° and 78° which practically covers a field of view sufficiently wide for a compact camera.

While a curved image plane is contributory to the correction of the curvature of field and distortion, the wide angle lens system permits using a flat image plane.

The wide angle lens system of the invention permits using glass lenses for either one or both of the two lens elements $L_1$ and $L_2$.

The wide angle lens system is available for various still cameras including ordinary still cameras, electronic still cameras and CCTV monitor cameras.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A wide angle lens system, comprising in order from the object end to the image end an aperture stop a first meniscus lens element $L_1$ having a convex object end surface and a second positive power lens element $L_2$, the wide angle lens satisfying the following conditions:

$-0.10 < f_2/f_1 < 0.7$ $4.0 < f/R_1 < 7.5$ $0 < f/R_3 < 1.6$ $0.01 < D/f < 0.22$ where $f_1$ is the focal length of the first lens element $L_1$, $f_2$ is the focal length of the second lens element $L_2$, f is the overall focal length of the wide angle lens, $R_1$ is the radius of curvature of the object end surface of the first lens element $L_1$, $R_3$ is the radius of curvature of the object end surface of the second lens element $L_2$, and D is the axial distance between the object end surface of the first lens element $L_1$ and the image plane.

2. A wide angle lens system as defined in claim 1, wherein at least one of said first lens element $L_1$ and said second lens element $L_2$ has at least one aspherical surface defined by the following relationship:

$$X = \frac{Cy^2}{1 + \sqrt{1 - KC^2Y^2}} + a_1Y^4 + a_2Y^6 + a_3Y^8 + a_4Y^{10}$$

where X is the surface sag at a semi-aperture distance Y from the axis A of the lens system, C is the curvature of a lens surface at optical axis A equal to the reciprocal of the radius at the optical axis, K is a conic constant, and $a_1$—$a_1$ are aspheric coefficients.

3. A wide angle lens system as defined in claim 1, wherein each of said first lens element $L_1$ and said second lens element $L_2$ is made of plastic.

4. A wide angle lens system as defined in claim 3 scaled to an angle of view of 67.4° substantially described as follows:

| Element | Radius of Curvature(mm) | Axial Distance Between surfaces(mm) | Nd | v |
|---|---|---|---|---|
| $L_1$ | $R_1 = 5.309$ | | | |
| | | $d_1 = 1.50$ | 1.49116 | 57.8 |
| | $R_2 = 4.654$ | | | |
| | | $d_2 = 0.90$ | | |
| | $R_3 = 198.555$ | | | |
| $L_1$ | | $d_3 = 1.50$ | 1.49116 | 57.8 |
| | $R_4 = -14.089$ | | | |

Aspherical Surface: $R_1$ and $R_3$
Conic Constant and Aspherical Coefficient:

| | $R_1$ | $R_2$ |
|---|---|---|
| K | 7.44698 | 3674.719 |
| $a_1$ | $-0.637315 \times 10^{-2}$ | $0.781399 \times 10^{-3}$ |
| $a_2$ | $0.968608 \times 10^{-4}$ | $0.141142 \times 10^{-3}$ |
| $a_3$ | $-0.571697 \times 10^{-3}$ | $-0.548809 \times 10^{-5}$ |
| $a_4$ | 0.0 | 0.0 | where the reference R followed by an arabic numeral indicates the radius of the lens surface progressively from the object end to the image end of the lens system, the reference d followed by an arabic numeral indicates the axial distance between lens surfaces progressively from the object end to the image end of the lens system, Nd is the index of refraction of the lens element as measured with d-line, and v is the Abbe number of the lens element.

5. A wide angle lens system as defined in claim 4, wherein said aperture stop is located at an axial point on the object side where the vertex of said object end convex surface of said first lens element $L_1$ is positioned.

6. A wide angle lens system as defined in claim 5, wherein each of said first lens element $L_1$ and said second lens element $L_2$ is made of plastic.

7. A wide angle lens system as defined in claim 3 scaled to an angle of view 2ω of 74.5° substantially described as follows:

| Element | Radius of Curvature(mm) | Axial Distance Between surfaces(mm) | Nd | v |
|---|---|---|---|---|
| $L_1$ | $R_1 = 4.439$ | | | |
| | | $d_1 = 1.40$ | 1.49244 | 57.6 |
| | $R_2 = 4.580$ | | | |
| | | $d_2 = 1.66$ | | |
| | $R_3 = 37.913$ | | | |
| $L_1$ | | $d_3 = 1.60$ | 1.49244 | 57.6 |
| | $R_4 = -30.538$ | | | |

Aspherical Surface: $R_4$
Conic Constant and Aspherical Coefficient:

| | $R_4$ |
|---|---|
| K | 1.00 |
| $a_1$ | $0.2645396 \times 10^{-3}$ |
| $a_2$ | $-0.193124 \times 10^{-4}$ |
| $a_3$ | $0.129464 \times 10^{-6}$ |
| $a_4$ | $0.807664 \times 10^{-9}$ | where the reference R followed by an arabic numeral indicates the radius of the lens surface progressively from the object end to the image end of the lens system, the reference d followed by an arabic numeral indicates the axial distance between lens surfaces progressively from the object end to the image end of the lens system, Nd is the index of refraction of the lens element as measured with d-line, and v is the Abbe number of the lens element.

8. A wide angle lens system as defined in claim 7, wherein said aperture stop is located at an axial point on the object side where the vertex of said object end convex surface of said first lens element $L_1$ is positioned.

9. A wide angle lens system as defined in claim 8, wherein each of said first lens element $L_1$ and said second lens element $L_2$ is made of plastic.

10. A wide angle lens system as defined in claim 3 scaled to an angle of view 2ω of 75.2° substantially described as follows:

| Element | Radius of Curvature(mm) | Axial Distance Between surfaces(mm) | Nd | v |
|---|---|---|---|---|
| $L_1$ | $R_1 = 4.289$ | | | |
| | | $d_1 = 1.30$ | 1.49244 | 57.6 |
| | $R_2 = 4.481$ | | | |
| | | $d_2 = 1.39$ | | |
| | $R_3 = 17.550$ | | | |
| $L_1$ | | $d_3 = 1.90$ | 1.49244 | 57.6 |
| | $R_4 = 767.040$ | | | |

Aspherical Surface: $R_4$
Conic Constant and Aspherical Coefficient:

| | $R_4$ |
|---|---|
| K | $-71158.06$ |
| $a_1$ | $0.762047 \times 10^{-3}$ |
| $a_2$ | $-0.610663 \times 10^{-4}$ |
| $a_3$ | $0.316390 \times 10^{-5}$ |
| $a_4$ | $-0.798321 \times 10^{-7}$ | where the reference R followed by an arabic numeral indicates the radius of the lens surface progressively from the object end to the image end of the lens system, the reference d followed by an arabic numeral indicates the axial distance between lens surfaces progressively from the object end to the image end of the lens system. Nd is the index of refraction of the lens element as measured with d-line, and v is the Abbe number of the lens element.

11. A wide angle lens system as defined in claim 10, wherein said aperture stop is located at an axial distance of 3.0 mm on the object side from a vertex of said object end surface of said meniscus lens element $L_1$ is positioned.

12. A wide angle lens system as defined in claim 11, wherein each of said first lens element $L_1$ and said second lens element $L_2$ is made of plastic.

13. A wide angle lens system as defined in claim 3 scaled to an angle of $2\omega$ of 77.5° substantially described as followed:

| Element | Radius of Curvature(mm) | Axial Distance Between surfaces(mm) | Nd | v |
|---|---|---|---|---|
| $L_1$ | $R_1 = 5.067$ | | | |
| | | $d_1 = 1.82$ | 1.49244 | 57.6 |
| | $R_2 = 5.006$ | | | |
| | | $d_2 = 0.88$ | | |
| | $R_3 = 15.926$ | | | |
| $L_1$ | | $d_3 = 1.98$ | 1.49244 | 57.6 |
| | $R_4 = -96.500$ | | | |

-continued

Aspherical Surface: $R_2$ and $R_4$
Conic Constant and Aspherical Coefficient:

| | $R_2$ | $R_4$ |
|---|---|---|
| K | −1.191124 | −15853.73 |
| $a_1$ | $-0.458142 \times 10^{-3}$ | $0.413083 \times 10^{-3}$ |
| $a_2$ | $0.124943 \times 10^{-2}$ | $-0.143931 \times 10^{-4}$ |
| $a_3$ | $-0.201013 \times 10^{-3}$ | $-0.298829 \times 10^{-6}$ |
| $a_4$ | $0.626870 \times 10^{-16}$ | $-0.792994 \times 10^{-14}$ | where the reference R followed by an arabic numeral indicates the radius of the lens surface progressively from the object end to the image end of the lens system, the reference d followed by an arabic numeral indicates the axial distance between lens surfaces progressively from the object end to the image end of the lens system. Nd is the index of refraction of the lens element as measured with d-line, and v is the Abbe number of the lens element.

14. A wide angle lens system as defined in claim 13, wherein said aperture stop is located at an axial point on the object side where the vertex of said object end convex surface of said first lens element $L_1$ is positioned.

15. A wide angle lens system as defined in claim 14, wherein each of said first lens element $L_1$ and said second lens element $L_2$ is made of plastic.

* * * * *